(12) United States Patent
Duqueine et al.

(10) Patent No.: US 8,663,526 B2
(45) Date of Patent: Mar. 4, 2014

(54) METHOD AND DEVICE FOR MOULDING A CURVED PART MADE FROM COMPOSITE MATERIAL AND CORRESPONDING PART

(75) Inventors: Gilles Duqueine, Fontaines sur Saone (FR); Jerome Aubry, Saint Baudille de la Tour (FR)

(73) Assignee: Airbus, Blagnac (FR)

( * ) Notice: Subject to any disclaimer, the term of this patent is extended or adjusted under 35 U.S.C. 154(b) by 578 days.

(21) Appl. No.: 12/920,963

(22) PCT Filed: Mar. 5, 2009

(86) PCT No.: PCT/FR2009/050359
§ 371 (c)(1),
(2), (4) Date: Dec. 13, 2010

(87) PCT Pub. No.: WO2009/115736
PCT Pub. Date: Sep. 24, 2009

(65) Prior Publication Data
US 2011/0104432 A1 May 5, 2011

(30) Foreign Application Priority Data
Mar. 7, 2008 (FR) ...................... 08 01260

(51) Int. Cl.
*B29C 70/34* (2006.01)
(52) U.S. Cl.
USPC ............................ 264/258; 264/295; 264/339
(58) Field of Classification Search
None
See application file for complete search history.

(56) References Cited

U.S. PATENT DOCUMENTS

| | | | | |
|---|---|---|---|---|
| 4,734,146 | A * | 3/1988 | Halcomb et al. | 156/148 |
| 5,954,917 | A * | 9/1999 | Jackson et al. | 156/433 |
| 6,523,246 | B1 * | 2/2003 | Matsui et al. | 29/559 |
| 6,613,258 | B1 | 9/2003 | Maison et al. | |
| 2006/0216480 | A1 * | 9/2006 | Weidmann et al. | 428/174 |
| 2007/0029038 | A1 | 2/2007 | Brown et al. | |
| 2009/0057948 | A1 * | 3/2009 | Krogager et al. | 264/258 |

FOREIGN PATENT DOCUMENTS

FR 2766407 1/1999

OTHER PUBLICATIONS

"Wind." in: Merriam-Webster.com [online], [retrieved on May 22, 2013]. Retrieved from the Internet, <URL: http://www.merriam-webster.com/dictionary/wind>.*
International Search Report, PCT/FR2009/050359.

* cited by examiner

*Primary Examiner* — Jeffrey Wollschlager
*Assistant Examiner* — David Schmerfeld
(74) *Attorney, Agent, or Firm* — Young & Thompson

(57) ABSTRACT

This relates to a method, a device and a curved molded member made of composite material. From at least one composite strip (24) formed of at least two tapes (3, 4, 5) made of unidirectional reinforcing fibers, pre-impregnated with resin and pre-compacted one with the other, the strip is applied longitudinally on a silicone flexible mandrel (13), by compaction under vacuum to confer the specific shape of the mandrel to it, the resulting strip (24) is deposited on a heated metal tool (31) having a curve that complements the shape of the mandrel and forming the core (32) of a pressure and temperature application mold (26), the flexible mandrel is removed then the mold is brought to pressure and temperature for polymerization, and the member is demolded after cooling.

7 Claims, 4 Drawing Sheets

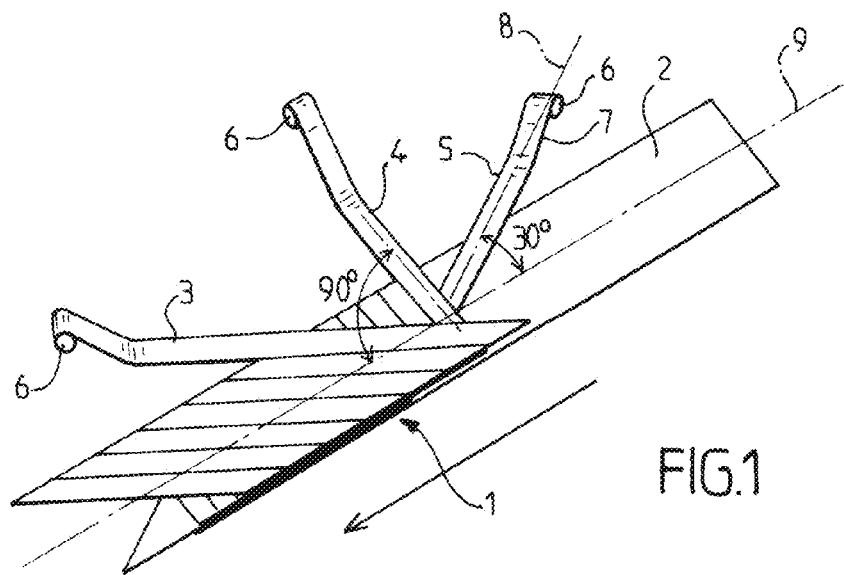
FIG.1
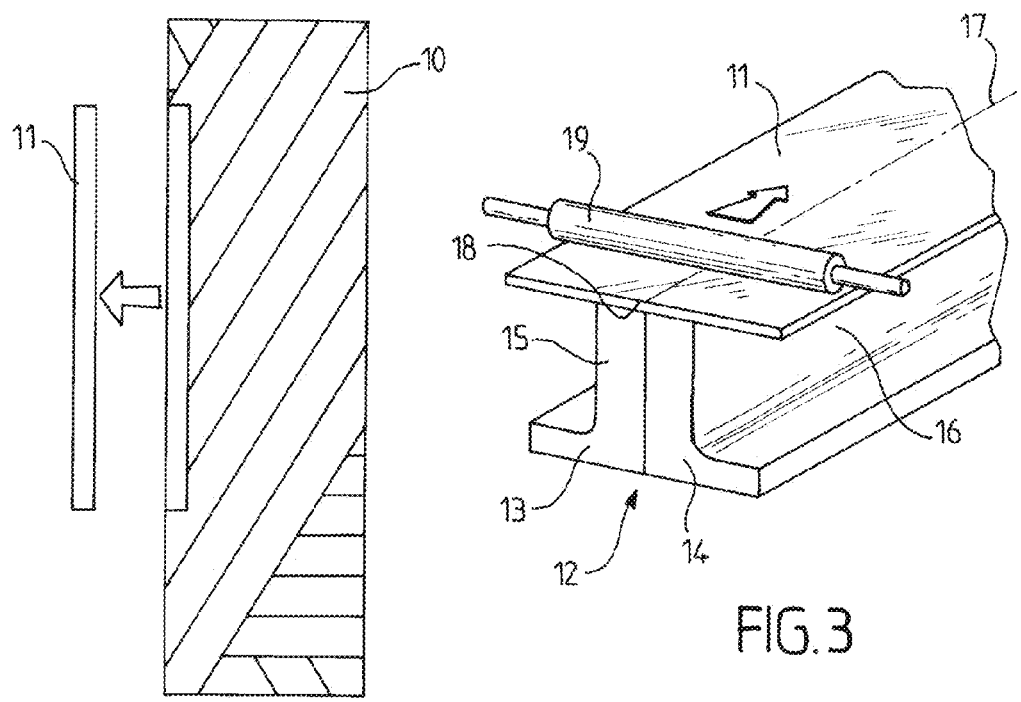
FIG.2
FIG.3

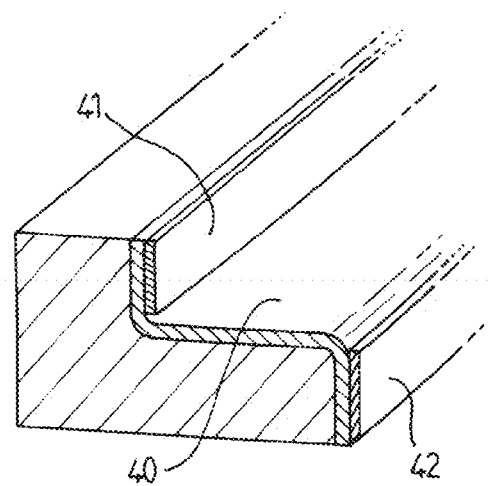 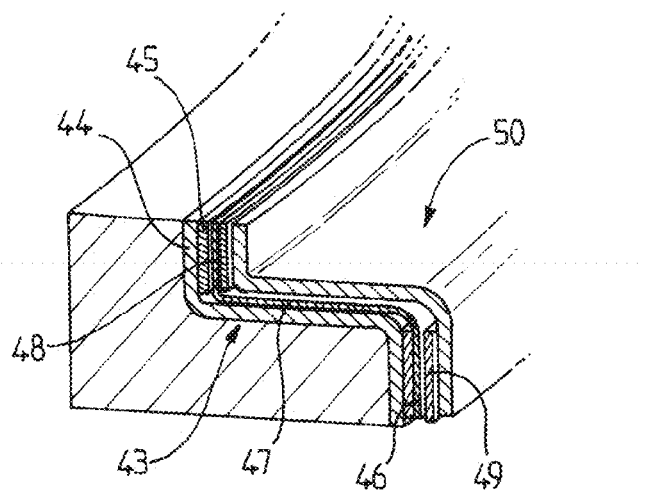
FIG.10A  FIG.10B
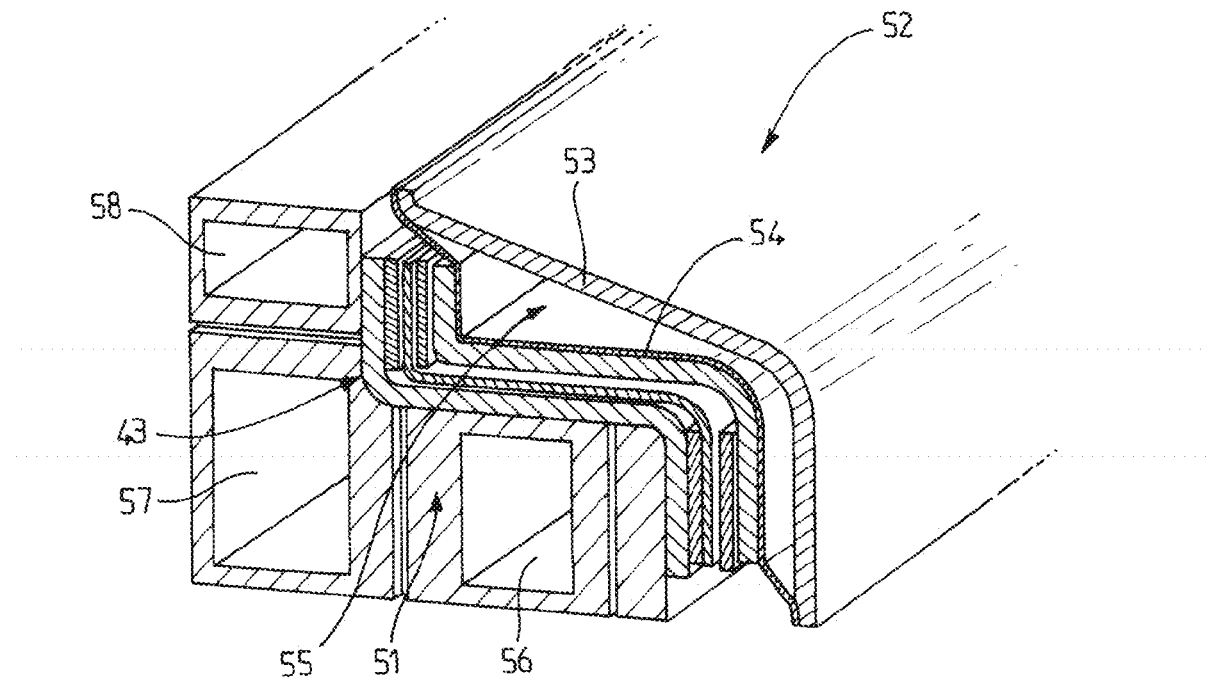
FIG.11

METHOD AND DEVICE FOR MOULDING A CURVED PART MADE FROM COMPOSITE MATERIAL AND CORRESPONDING PART

BACKGROUND OF THE INVENTION

1. Field of the Invention

This invention relates to a method for molding a curved member made of a composite material, specifically a member having a cross-section forming an angle, e.g. in the shape of an Ω, U, Z, C or V.

It also relates to a device for molding such a member with a non-zero curvature radius, as well as the corresponding curved members.

It has a particularly important, though not exclusive, application in the field of sections made of composite materials used in aeronautics, for the realization of production members, e.g. for an aircraft fuselage.

But it can also be used in other fields requiring good strength, particularly in all industrial fields as well as those relating sports.

2. Description of the Related Art

Methods and devices are already known for manufacturing curved profiles made of composite material.

They are obtained by progressively laying up fabric impregnated by hand and/or, in the case of construction of production elements, by a wire-by-wire layup using robots allowing the wires to be placed with precision so as to optimize the elastic modulus and strength.

Such solutions have drawbacks.

They require dedicated and complex automated systems, i.e. costly investment, and this for low productivity due to the necessarily reduced rates which are all such devices permit.

The relatively poor uniformity in fanning out the fibers used also causes poor mechanical performance.

SUMMARY OF THE INVENTION

The present invention seeks to provide a method, a device and members better fulfilling the requirements of the practice than those previously known, particularly because it allows such members made of composite material to be obtained with exceptional elastic modulus and strength starting from a uniform layup, without excessive cost, the excellent outcome in terms of the layup allowing improved mechanical performance of the final product by making it more homogeneous, with improved reliability and in a manner simple to implement.

To this end this invention essentially proposes a method for molding a curved member made of composite material, characterized in that, from at least one composite strip extending along a longitudinal axis formed by at least two tapes of unidirectional reinforcing fibers arranged in orientations different to the longitudinal axis, the tapes being pre-impregnated with resin and pre-compacted with one another at a specified pressure and temperature, the strip is applied longitudinally on a silicone flexible mandrel, by vacuum compaction at a second temperature, to confer the specific shape of the mandrel to it, said resulting strip is deposited onto a heated metal tool having a curve that complements the shape of the mandrel and forming the core of a pressure and temperature application mold, to confer to the strip the desired shape of the curved member by progressively winding the flexible mandrel, the flexible mandrel is removed once the strip has been deposited in full, then the mold is pressurized and brought to temperature over the assembly thus obtained for polymerization, and the member thus formed is extracted after cooling.

Advantageously, the member has a cross-section forming an angle.

"Flexible mandrel" means a mandrel that can be deformed between a straight position and a curved position, but with a rigid or substantially rigid cross-section allowing the shape of the member in cross-section to be obtained.

In advantageous embodiments one and/or the other of the following layouts are also used:

the unidirectional fibers of at least two tapes are symmetrical in relation to the axis of the strip;

the composite strip is formed from three superimposed tapes bonded to each other by compaction, the parallel fibers from each of the tapes forming an angle to the axis of the strip with values of, respectively, 90°−a°, 90°, 90°+a°, with a ranging for example from 10° to 80°.

In other variants, the angles may be of 90°−a/90°+b/90°+a/90°+b, symmetrical or not around 90°, or angles of other values imposed by the search for the best strength and/or for a specific elasticity, according to the anticipated stresses on the member;

the member being realized from at least two reinforcing fiber composite strips, namely a first strip and a second strip, formed respectively on a first silicone flexible mandrel and a second silicone flexible mandrel, and after the first strip is deposited onto said tool and removed from the first silicone mandrel, the second strip is deposited on the first strip by winding the second flexible mandrel step by step, before removing the second mandrel, pressure and temperature are then applied for molding the curved member made of composite material thus formed by sandwiching of these two strips.

The second mandrel is identical to the first mandrel and/or of a shape such that the second strip is applied as desired onto the first strip, after removing said second mandrel from the mold.

at least one reinforcing ribbon comprising unidirectional fibers running parallel to the longitudinal axis of the strip is inserted between two strips and/or superimposed on a strip;

the fibers are made of carbon and the resin is epoxy resin;

the mandrels are obtained from dies with an Ω-shaped cross-section cut in two along the plane of symmetry to obtain a Z-shaped section of the strip in question. In the most usual embodiment, the angles between the branches of the Z are right angles.

at least three successive layers of said composite strips are realized.

The invention also proposes a device for molding a section made of composite material with a non-zero curvature radius from at least one composite strip extending along a longitudinal axis, characterized in that the strip being formed by stacking at least two tapes of reinforcing fibers arranged in different orientations to the longitudinal axis, the tapes being pre-impregnated with resin and pre-compacted to each other at a specified pressure and temperature, the device comprises at least a first silicone flexible mandrel, means of vacuum compaction at a first temperature of said strip on the first mandrel to give it the specific shape of said mandrel, a heated metal tool having a curve that complements the shape of the first mandrel and forming the core of a pressure mold, arranged to give said strip the desired shape of the curved member, means of guiding and presenting assemblies consisting of the mandrel and strip of complementary shape, installed so as to deposit said strip by spreading the flexible mandrels in step with the shaping of the first strip round the tools means of setting the mold under pressure and temperature over the assembly thus obtained for polymerization, and cooling means before extracting the member thus formed after cooling.

Advantageously, the member being realized from at least two composite reinforcing fiber strips, i.e. a first strip and a second strip, it comprises in addition a second silicone flexible mandrel to form the second strip and means of depositing the second strip on the first after the first silicone mandrel has been withdrawn.

The shape of the second mandrel is thus complementary to that of the second strip, itself arranged to fit together with the first strip, whose shape it has, still complementary here, the two strips being in contact with each other directly or indirectly over the whole length.

Also advantageously the device further comprises means for depositing on a strip at least one ribbon comprising unidirectional reinforcing fibers.

In another advantageous embodiment, the following arrangements are used:

the device further comprises means of forming composite strips by superposing a third tape on the first two and progressively applying said third tape to bind it with the others by compaction, the parallel fibers of each of said tapes forming angles between them with values of $90°-a°$, $90°$, $90°+a°$ respectively, advantageously with $10°<a<80°$, e.g. $a=30°$;

the tool is circular in shape, forming a rotating mobile carousel allowing the various successive reinforcing strip(s) and ribbon(s) to be deposited;

the means of guiding and presenting assemblies consisting of the mandrel and strip of complementary shape comprise rectilinear straight grooves;

the mandrels are obtained from dies with a $\Omega$-shaped cross-section cut in two along the plane of symmetry to obtain a Z-shaped cross-section of the strip in question;

the mandrels are obtained from dies with a U-shaped cross-section, cut in two along the plane of symmetry to obtain a L-shaped cross-section of the strip in question.

The invention also proposes a member realized according to the method described above.

It also relates to a member made of composite material having a configuration with a first part having a non-zero curvature radius, comprising at least one composite strip extending along a longitudinal axis, characterized in that the strip is formed by stacking at least two tapes of unidirectional reinforcing fibers arranged in orientations different to the longitudinal axis of the strip and to that of the others, the tapes being pre-impregnated with resin and pre-compacted to each other at a specified pressure and temperature, the strip being deformed according to said configuration, and having a progressive fanning of fibers in the plane of application by regular angular opening deformation obtained over the width of the strip, and that the member has an $\Omega$-, U-, L-, Z-, C- or V-shaped cross-section.

Advantageously its cross-section is Z- or L-shaped.

Also advantageously it has at least a second part having a non-zero curvature radius and/or the unidirectional fibers of two of the tapes are symmetrical in relation to the axis of the strip, and/or the composite strip comprises three superimposed tapes agglomerated to each other by compaction, the parallel fibers of each of the tapes forming an angle with the axis of the strip with a value of, respectively: $90°-a°$, $90°$, $90°+a°$, e.g. with a such that: $10°<a<80°$.

The invention also propose a member characterized in that it comprises at least two composite reinforcing fiber strips, i.e. a first strip and a second strip, directly or indirectly deposited on said first strip, and formed respectively on a first silicone flexible mandrel and a second silicone flexible mandrel and/or it comprises, sandwiched between two strips and/or superimposed on a strip, —at least one reinforcing ribbon comprising unidirectional fibers running parallel to the longitudinal axis of the strip.

The invention will be better understood by reading the following description of non-limiting examples of embodiments given below.

BRIEF DESCRIPTION OF THE DRAWING FIGURES

The description refers to the accompanying drawings in which:

FIG. 1 is a perspective top view of an embodiment of tapes stacked along three different axes, to form a semi-product for strips of the type used with the invention.

FIG. 2 shows the cutting of such composite material strips, from the semi-product described in FIG. 1.

FIG. 3 shows, in perspective, a symmetrical silicone mandrel with an $\Omega$-shaped cross-section, used in an embodiment of the invention more specifically described here, with pre-layup of a strip on the upper part.

FIG. 11 shows, in perspective and in cross-section, a component of the tool in FIG. 6, showing the metal counter-mold for curing the member under pressure according to an embodiment of the invention.

DETAILED DESCRIPTION OF THE INVENTION

Figure 4:
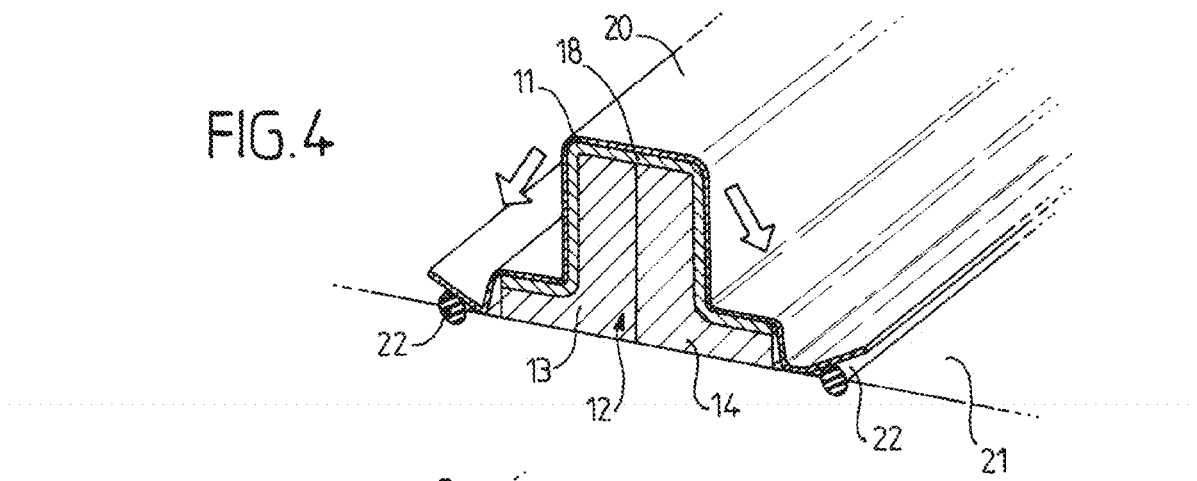
FIG. 4 shows the placing and forming of said strip with an $\Omega$-shaped cross-section on the silicone mandrel, by application and deformation under vacuum.

FIG. 1 shows an embodiment of an example of a semi-product 1 allowing the manufacture of a composite strip used with the method according to the invention.

The semi-product 1 is obtained by successive windings around a rectangular base 2, of three tapes 3, 4 and 5, consisting of carbon fibers that are unidirectional in the axial direction, pre-impregnated with epoxy resin, rectangular, identical and unwound continuously or semi-continuously from rollers 6. The fibers 7 are located in the longitudinal direction 8 of the tapes, their coating angle being different, for example and as shown in FIG. 1 angles respectively of 30°, 90° and 120° to the axis 9 of the base.

A ribbon is thus formed of three superimposed tapes, whose fiber angles are arranged in different orientations from those of the axis of the ribbon.

The semi-product 1 is then compacted at a specified temperature and absolute pressure to obtain the plate 10 of FIG. 2, corresponding to one of the surfaces of the base 2.

The specified temperature and pressure will depend, in a manner known in itself, at the same time on the resin used, on the selected fibers, on the strength and resilience of the section required after polymerization, etc.

Advantageously, the compaction pressure can, for example, be of the order of 0.8 bars, by placing the tapes in a vacuum and plating them to one another in a corresponding enclosure, but it can also be obtained by external pressure in a press, or through a press roller at pressures of up to 3, 4 or even 5 bars.

The specified temperature used for this preparation of the multi-tape strips is advantageously a temperature above 40° C., permitting proper curing of the resins.

But an ambient temperature of 15° C. or below 20° C. is also possible.

From ribbon 10, strips 11 formed by compacted multi-directional tapes are extracted.

With reference to FIG. 3, and to the embodiment more specifically described here, the strip 11 is then laid up over the mandrel or template 12, made of a flexible semi-rigid plastic or rubber material, e.g. silicone, having a Ω-shaped cross-section.

The mandrel 12 is formed by two angle irons 13, 14 at a right angle joined together by the external surface of their respective cores 15, 16.

The Ω-shaped section can be separated in two at its plane of symmetry 17, to obtain forms whose cross-section is S- or Z-shaped.

Hereinafter, the same reference numbers will be used to designate identical or similar elements.

Figure 5:
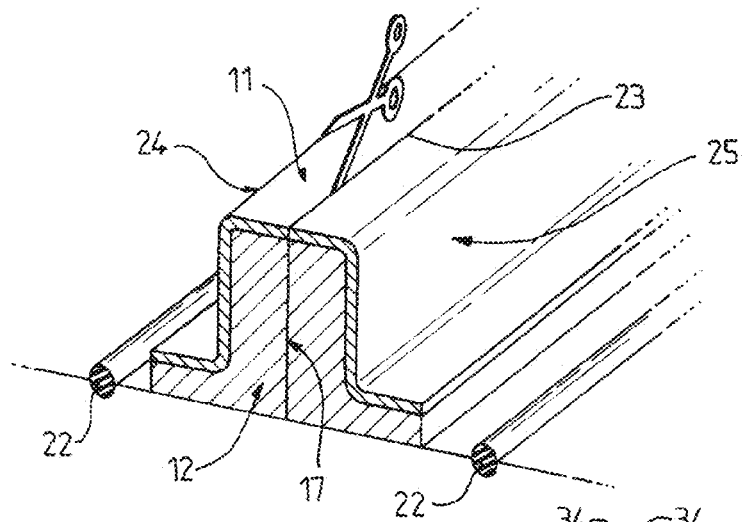
FIG. 5 shows the cutting of Z-shaped sections from the strip configured in FIG. 4.

With reference to FIGS. 3, 4 and 5, one then proceeds, as an example, as follows:

First of all, strip 11 is applied longitudinally onto the flat upper surface 18 of the Ω of the mandrel 12.

To do this, it is pressed gradually, for example using a press roller 19, or by other means such as using a progressively unwound roll on which the strip has been wound.

The pressure can be low (a few kg). It allows the strip to be correctly positioned and to be symmetrically clamped on the mandrel or template, which itself is relatively flexible but rigid enough to permit such an application without deformation.

In a second step, and after the strip has been positioned, it is entirely applied longitudinally onto the template by vacuum compaction, at the specified temperature of the enclosure in which the application operation takes place (for example 20° C.), to give the specific shape of the template, a shape which, at this stage, does not have any curvature radius.

To achieve this, and for example, a cover 20 made of silicone cloth or any other flexible and leak-proof material is plated onto the strip 11, the cloth being mounted in a hinged frame (not shown).

The above operations can advantageously be carried out automatically.

Then the interstitial space between the cloth and the base table 21, on which the template is placed, is vacuum draught, tightness being provided along the whole length by gaskets 22.

The silicone cover then compresses the strip 11 and forces it to take the shape of the template, by progressive action of the inner surface of the cover on the strip in a uniform manner over the entire width of the silicone template.

Thus, regular deformation of the strip which takes the desired Ω shape is obtained, as shown in FIG. 4.

Once the cover 20 is removed, and if the required section is an S- or Z-shaped section, then the tape is cut longitudinally in two along the line 23, in the separation plane of the two symmetrical angle irons in relation to the plane 17.

The two rectilinear sub-preforms 24 and 25 with Z-shaped cross-section are then separated, currently identical and symmetrical.

Figure 6:
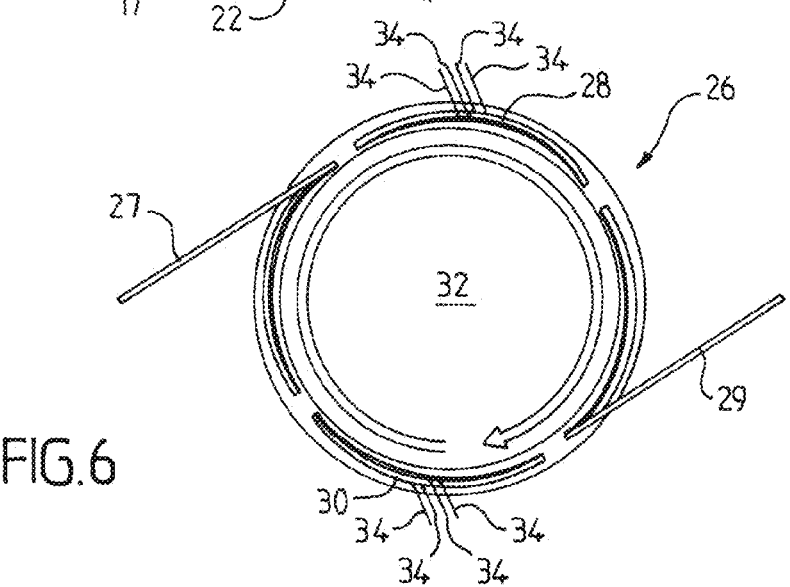
FIG. 6 is a partial schematic view of a carousel device according to an embodiment of the invention, allowing the simultaneous placing of two strips and several reinforcing ribbons.

The remainder of the method requires a mold 26, a partial example of realization of which is shown in FIG. 6.

This mold 26 allows for example the processing of several sections 27, 28, 29, 30, as will be described below.

Figure 7:
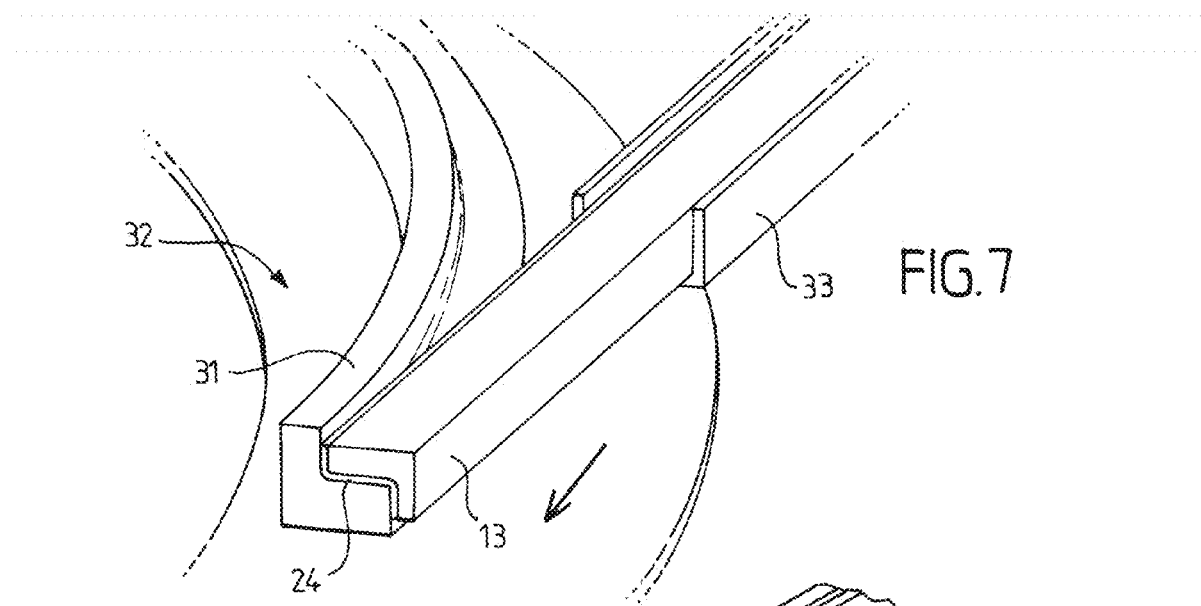
FIG. 7 is an enlarged perspective view showing the continuous depositing and curved deformation of a strip realized on the metallic tools of the carousel in FIG. 6, using a silicone mandrel, according to an embodiment of the invention using a channel.

With reference to FIG. 7, the Z-shaped strip 24 thus obtained is deposited with its half-template 13 onto a heated metallic tool 31, having in cross-section a shape that complements the template and forming the core 32 of mold 26 (the lid of which is not shown).

The tool has a curved shape which allows the Z-shaped strip to be given the required curvature of the member, in a regular fashion, permitting a progressive fanning of the fibers in the transversal direction of the strip.

The pressure and temperature application mold 26 has, for example, a carousel shape, as shown in FIG. 6.

It allows various phases of forming required member sections to be carried out continuously and then several members to be cured at the same time, such as the four quarters of a circular or oval member of an airplane fuselage.

In the embodiment described more specifically here, the carousel comprises four deposition stations, which can thus be done simultaneously as it rotates, semi-continuously, or continuously.

A first station deposits, by deforming it, the strip 27, the flexible silicone mandrel bending itself simultaneously over the metal tool 31 formed by a heatable angle iron, for example made of steel.

Figure 8:
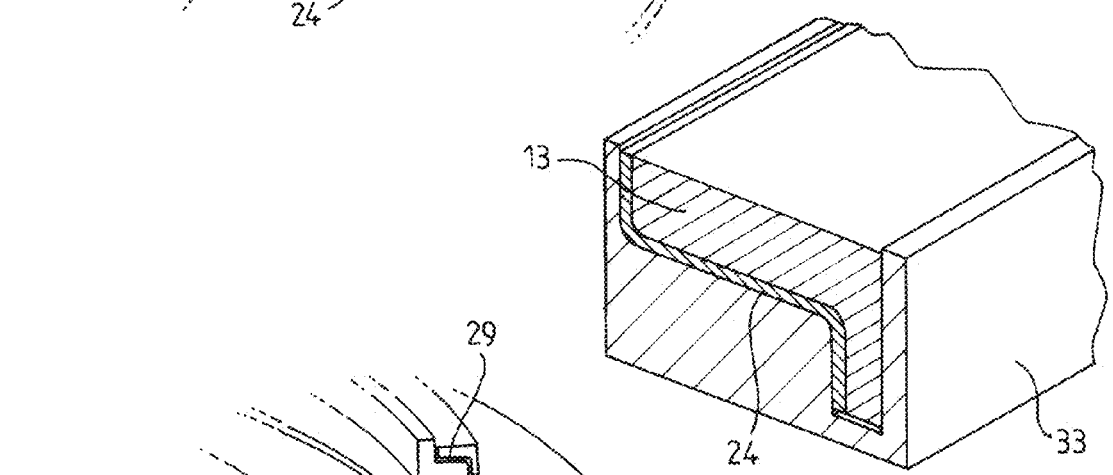
FIG. 8 is a perspective view of the channel in FIG. 7.

To do this the strip 27 and its mandrel 13 are presented, by a fixed rectilinear channel 33, with a cross-section that complements that of the whole strip+template (see FIG. 8).

The metal tool is hollow with water circulation, allowing a carefully controlled deposition temperature to be maintained and then to provide the subsequent different temperature variations, for the polymerization under pressure, as will be described with reference to FIG. 11.

A second identical station, located symmetrically on the other side of the circular carousel, is provided for depositing a second strip 29. The depositing is advantageously automated, the orientation and fanning of the fibers to follow the curve being perfectly uniform, and regularly progressive in the transverse direction, thanks to the presence of the silicone templates.

Figure 9:
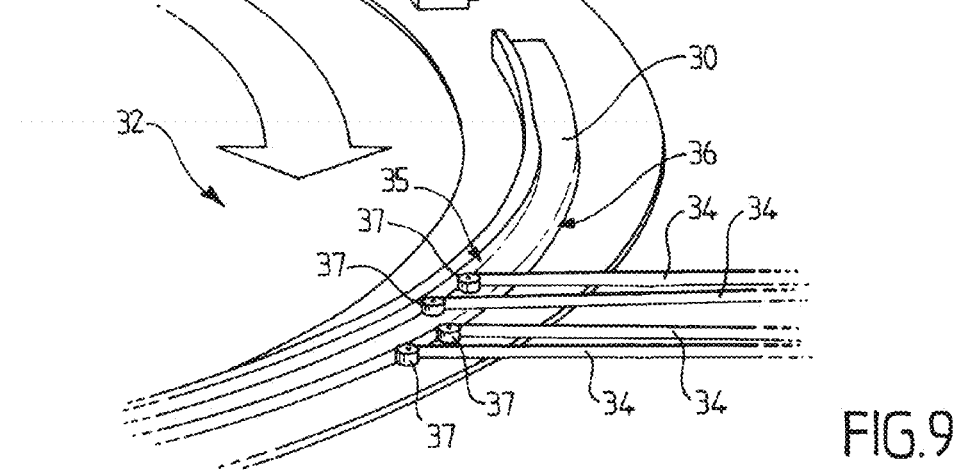
FIG. 9 is a perspective view showing a part of the device in FIG. 7, making it possible to obtain the sections, shown in FIGS. 10a and 10b as an example, by depositing successive layers.

In the embodiment more specifically described with reference also to FIG. 9, reinforcing ribbons 34 are additionally deposited on the surfaces, for example vertical 35, 36, of the Z-shaped cross-section strips obtained, for example as two successive layers of ribbons formed of unidirectional carbon fibers with axes parallel to the curve formed by the tool.

The depositing of ribbons of unidirectional carbon tapes is performed in a single operation following the rotation of the core 32 of mold 26, by pre-applying one end of the ribbons then unwinding the ribbons driven by friction during said rotation, from free supply rollers (not shown), a press roller 37 allowing foaming to be limited and to position them properly in place.

During additional rotations of the mold, a second strip and/or a third strip can be deposited on the first strip, in the same way as the first, the latter being configured around a second or third mandrel identical to the first to allow successive stackings of complementary shape.

Embodiments of members according to the invention are shown in FIGS. 10A and 10B, after removing the mandrels.

FIG. 10A shows a Z-shaped section 40, comprising two unidirectional reinforcing ribbons 41 and 42 applied on the vertical end surfaces of the Z.

FIG. 10B shows a more complex section 43, comprising in a sandwich, a first Z-shaped strip 44, two reinforcing ribbons 45, 46 on the end portions, a second Z-shaped strip 47, two second reinforcing ribbons 48, 49 and a third Z-shaped strip 50 which fully closes the sandwich.

Each strip may be constituted differently from two, three (or more) tapes oriented differently.

Once the member is thus shaped and fanned in a regular fashion, a tool for polymerization under pressure at high temperature is positioned.

FIG. 11 shows a cross-section view, partially in perspective, of the complex section 43 of FIG. 10B in place on the male part 51 of the tool described above, belonging to the carousel mold.

This male part 51 belongs to the body of the mold and is sealed with a leak-proof metal counter-mold 52 comprising an outer wall 53 for protection and a silicone cover 54 which will be put under pressure in space 55 to compress the member 43 with a pressure of a few bars (e.g. 3 bars).

The male portion 51 comprises channels 56, 57, 58 for circulating water at high temperature in the metal tool all along the member 43 thanks to a water supply network (not shown).

This circulation, coordinated with the pressures exercised at 55 by a PLC-controlled compression system (not shown) known in itself, allow specified curing cycles to be realized, which are themselves determined based on the polymerization properties of the member as required and defined by the constraints of the latter's specifications.

Once the polymerization has been realized, the member thus produced is cooled, in known manner, by circulating cold water inside the mold instead of the heating water.

At the end of molding and after cooling, the member is demolded, trimmed and verified (ultrasound).

It goes without saying and it also follows from the foregoing that the present invention is not limited to the embodiments described more specifically. On the contrary, it encompasses all variants and particularly those in which several curves are obtained with the member, allowing for multiple more or less complex configurations with or without a point or points of inflection, those in which the sections are of variable diameter and/or with different cross-sections along their length, those in which the strips used are composed of only two tapes, or of more than three tapes each comprising fibers with different orientations but not parallel to the longitudinal axis of said strip.

The invention claimed is:

1. A method for molding a curved member made of composite material formed from a first composite strip extending along a longitudinal axis formed by at least two tapes of unidirectional reinforcing fibers arranged in orientations different to the longitudinal axis, comprising:
   pre-impregnating the tapes with resin and pre-compacting the tapes at a specified pressure and temperature;
   applying the first strip longitudinally on a first silicone flexible mandrel, by compaction under vacuum at a second temperature, to confer a specific shape of the first mandrel to the first strip;
   depositing said resulting first strip onto a heated metal tool having a curve that complements the shape of the first mandrel and forming a core of a pressure and temperature application mold, to confer to the first strip a desired shape of the curved member by progressively winding the first flexible mandrel;
   removing the first flexible mandrel once the first strip has been deposited in full;
   pressurizing the mold and bringing the mold to temperature over the assembly thus obtained for polymerization; and
   extracting the member thus formed after cooling,
   wherein the member is formed from at least two reinforcing fiber composite strips, which include the first strip and a second strip, formed respectively on the first silicone flexible mandrel and a second silicone flexible mandrel, and after the first strip is deposited onto said tool and removed from the first silicone mandrel, the second strip is deposited on the first strip by progressively winding the second flexible mandrel, before removing the second mandrel, and
   pressure and temperature are then applied for molding the curved member made of composite material.

2. The method according to claim 1, wherein the unidirectional fibers of at least two of the tapes are symmetrical in relation to the longitudinal axis of the first strip.

3. The method according to claim 2, wherein the first composite strip is formed from three superimposed tapes bonded to each other by compaction, the parallel fibers of each of the tapes forming an angle to the longitudinal axis of the first strip with values of, respectively, 90°−a°, 90°, 90°+a°.

4. The method according to claim 1, wherein at least one reinforcing ribbon comprising unidirectional fibers running parallel to the longitudinal axis of the first strip is inset between two strips and/or superimposed on a strip.

5. The method according to claim 1, wherein the fibers are made of carbon and the resin is an epoxy resin.

6. The method according to claim 1, wherein the mandrels are obtained from dies with an Ω-shaped cross-section cut in two along the plane of symmetry to obtain a Z shape of the strip.

7. The method according to claim 1, wherein the member is formed from at least three successive layers of composite strips.

* * * * *

UNITED STATES PATENT AND TRADEMARK OFFICE
CERTIFICATE OF CORRECTION

PATENT NO. : 8,663,526 B2  Page 1 of 1
APPLICATION NO. : 12/920963
DATED : March 4, 2014
INVENTOR(S) : Duqueine et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 676 days.

Signed and Sealed this
Twenty-ninth Day of September, 2015

Michelle K. Lee
*Director of the United States Patent and Trademark Office*